United States Patent
Williams et al.

(10) Patent No.: US 8,354,552 B2
(45) Date of Patent: Jan. 15, 2013

(54) METHOD OF SURFACE MODIFICATION OF METALLIC HYDRIDE FORMING MATERIALS

(75) Inventors: Mario Williams, Johannesburg (ZA); Mykhaylo V. Lototsky, Johannesburg (ZA); Alexander N. Nechaev, Johannesburg (ZA); Vladimir M. Linkov, Johannesburg (ZA)

(73) Assignee: Eskom Holdings, Ltd., Johannesburg (ZA)

( * ) Notice: Subject to any disclaimer, the term of this patent is extended or adjusted under 35 U.S.C. 154(b) by 341 days.

(21) Appl. No.: 12/743,600

(22) PCT Filed: Nov. 21, 2008

(86) PCT No.: PCT/IB2008/054893
§ 371 (c)(1),
(2), (4) Date: Sep. 20, 2010

(87) PCT Pub. No.: WO2009/066263
PCT Pub. Date: May 28, 2009

(65) Prior Publication Data
US 2011/0009656 A1 Jan. 13, 2011

(30) Foreign Application Priority Data
Nov. 21, 2007 (ZA) .................................. 2007/09455

(51) Int. Cl.
*C07F 7/18* (2006.01)
*B05D 3/10* (2006.01)

(52) U.S. Cl. ............................................ 556/9; 427/304
(58) Field of Classification Search ........ 556/9; 427/304
See application file for complete search history.

(56) References Cited

U.S. PATENT DOCUMENTS
| 4,468,235 | A | 8/1984 | Hill |
| 5,605,585 | A | 2/1997 | Yamamoto et al. |
| 5,766,688 | A | 6/1998 | Law et al. |
| 6,165,643 | A | 12/2000 | Doyle et al. |

FOREIGN PATENT DOCUMENTS
JP 2005-116745 A 4/2005

OTHER PUBLICATIONS

Williams et al., "Surface functionalization of porous $ZrO_2$-$TiO_2$ membranes using y-aminopropyltriethoxysilane in palladium electroless deposition," Applied Surface Science, 254 (2008), 3211-3219, p. 3213.

*Primary Examiner* — Porfirio Nazario Gonzalez
(74) *Attorney, Agent, or Firm* — Stephen J. Weyer, Esq.; Stites & Harbison, PLLC

(57) ABSTRACT

The invention discloses a method of modifying the surface of a metallic hydride-forming material, through functionalization treating the surface of the metallic hydride-forming material with aminosilane to deposit self-assembled monolayers onto the surface. Thereafter at least one Platinum Group Metal is deposited onto the treated surface of the metallic hydride-forming material to allow chemical bonding to occur between the Platinum Group Metal(s) and the self-assembled monolayers.

25 Claims, 8 Drawing Sheets

A    B a b c

A

B

| PdCl₂ concentration [g/L] | AAS results | | | |
|---|---|---|---|---|
| | Before treatment | | After treatment | |
| | ABS units | Concentration [ppm] | ABS units | Concentration [ppm] |
| 0.1 | 0.022 | 74 | 0.002 | < 20 |
| 0.2 | 0.046 | 154 | 0.004 | < 20 |
| 0.5 | 0.096 | 332 | 0.005 | < 20 |
| 1.0 | 0.157 | 560 | 0.005 | < 20 |

METHOD OF SURFACE MODIFICATION OF METALLIC HYDRIDE FORMING MATERIALS

FIELD OF INVENTION

The present invention relates to a method of surface modification of metallic hydride forming materials.

More particularly, the present invention relates to a method of surface modification of metallic hydride forming materials with Platinum Group Metals (PGM).

BACKGROUND TO INVENTION

Application of metal hydrides (MH) is a very promising way to solve the problem of hydrogen recovery from process off-gases. The selectivity of reversible hydrogen interaction with hydride-forming materials allows the development of systems for hydrogen extraction from gas mixtures and its purification which are simple in layout and operation.

The main problem that hampers the realisation of this approach is in the deterioration of MH performances caused by gas impurities, in particular, oxygen and water vapours. This is mainly caused by slow hydrogen dissociation on the oxidized surface that was shown to be a very important partial step playing a substantial role in activation and passivation of hydrogen absorption reactions at ambient temperatures. That is why enhancement of the hydrogen sorption performances requires catalysis of the hydrogen exchange surface processes, including dissociation of $H_2$ molecules in the course of hydrogenation (hydrogen absorption) and recombination of H atoms during dehydrogenation (hydrogen desorption).

Surface modification of the metallic hydride-forming materials by Platinum Group Metals (PGM), enhances the overall poisoning resistance of the alloys towards many aggressive surface adsorbates (e.g. $H_2S$, CO, $CO_2$, $O_2$, $H_2O$) and provides higher $H_2$ absorption/desorption rates. PGM, including Palladium and Platinum, are excellent catalysts for hydrogen exchange reactions. PGM catalysts are known to lower the activation energy needed for breaking the H—H bond in $H_2$ molecules. The H atoms are then free to react at the PGM catalyst or hydrogen absorbent surface or leave the surface to participate in reactions elsewhere in the chemical system. PGM surface coatings enable hydrogen to pass rapidly through the surface of the MH to the bulk, while still maintaining the hydrogenation activity. PGM coatings have been observed to produce large increases in the activation kinetics of MH materials at room temperature as well as extending their cycle lifetimes.

Surface modification of the hydride forming metals and alloys by the deposition of PGM onto the surface of their particles is a known approach documented in a number of patents. The most typical ones are briefly described below:

According to U.S. Pat. No. 4,468,235 (Hill), a hydride forming titanium alloy was coated by a hydrogen-permeable metal (including Pd) that allowed usage of the coated alloy for hydrogen separation and purification; the metal coating was made by anodic etching of the alloy followed by electroless plating.

U.S. Pat. No. 6,165,643 (Doyle et al) discloses a hydrogen storage material comprising hydride-forming metallic particles whose surface has a discontinuous or partial deposit of one or more platinum group metals (e.g., Pd, Ru); the PGM deposition (0.08 to 2 wt. %) is carried out from aqueous solutions of their salts which can or cannot contain a reducing (hydrazine hydrate, sodium hypophosphite, etc.) and complexing (EDTA) agents; in the latter case the PGM reduction from the salts takes place by hydrogen desorbed from the preliminary hydrogenated substrate material.

Similarly, U.S. Pat. No. 5,766,688 (Law, Vyas) discloses a procedure for activation of metal hydrides that includes cathodic charging of a hydride forming material with hydrogen in aqueous electrolyte (this process is accompanied by the material fracturing to form a powder) followed by its plating with a metal (including Pd) to be reduced from the metal salt by the hydrogen from the metal hydride substrate.

The quality of the deposited PGM layers is paramount to the absorption performance and poisoning resistance of the surface-modified hydride forming metals and alloys. In turn, it is strongly dependent on the adhesion between the PGM particles and the alloy surface. In most combinations "PGM-alloy substrate" the adhesion is rather poor, resulting in a poor coating quality, loss of appreciable quantities of PGM metals, and deterioration of hydrogen absorption/desorption performances in the surface-modified materials.

A common approach which could be adopted in the surface modification of hydride forming alloys for use as a hydrogen separation/purification medium is an electroless deposition of PGM-based metal layers. This is a wet chemical reduction process in which aqueous metal ions, in alkaline or acidic baths, are auto-catalytically reduced at a solid-liquid interface in the absence of an applied external electrical current to activate the process. Most PGMs can be plated onto surfaces using this technique. Its advantages include low cost and simplicity, flexibility as to the state of the substrate (both monolith and powdered materials can be modified), high quality of the covering layers (uniform thickness, low porosity), the ability to plate non-conductive surfaces, etc. Catalysis of the electroless plating process is typically achieved through activation of the substrate in, e.g., a $PdCl_2$ solution. $Pd^{2+}$ ions are well known to be reduced on the colloidal $Sn^{2+}$ ions sensitized onto the surface of the substrate, although this physical adhesion is weak in nature and the resulting Pd nuclei are generally detached and lost in solution (i.e. bath decomposition). During sensitization the $Sn^{2+}$ ions attach themselves to the substrate surface oxide or hydroxyl groups. Activation then continues by $Pd^{2+}$ reduction into $Pd^0$ nuclei assisted by $Sn^{2+}$ oxidation. The $Pd^0$ species take on the role of reaction catalysts after the palladium deposition was allowed to commence on the activated substrate surface.

An obvious way for the realization of this approach may be in the use of multiple electroless deposition steps (substrate surface cleaning-sensitization/activation-autocatalytic reduction in a plating bath).

The conventional electroless plating is a costly and time-consuming exercise, and the preparation of uniform surface coatings is not guaranteed. Furthermore, the oxide layer on the surface of the core material inhibits interactions with PGM precursor ions in solution. Finally, PGM (e.g., Pd, Pt) colloidal particles have a poor adhesion to the substrate because of the absence of chemical conjunction. As a result, the PGM activation particles leach out into the solution, and further autocatalytic reduction of the noble metals takes place in the plating bath, rather than on the substrate surface. The end result is in the decomposition of the plating bath and the loss of the expensive plating agent.

It is an object of the invention to suggest a method for surface modification of metallic hydride-forming materials tag which will assist in overcoming the aforementioned problems.

SUMMARY OF INVENTION

According to the invention, a method of surface modification of a metallic hydride-forming material, includes the steps (a) of functionalization treating the surface of a metallic hydride-forming material with aminosilane to deposit self-assembled monolayers onto the surface; and
(b) of depositing at least one Platinum Group Metal onto the treated surface of the metallic hydride-forming material whereby chemical bonding occurs between the Platinum Group Metal(s) and the self-assembled monolayers.

Also according to the invention, a method of surface modification by an electroless deposition of Platinum Group Metals onto a substrate material, includes the steps:
(a) of functionalization by a pre-treatment of the surface of the substrate material with a solution of an aminosilane;
(b) of sensitization with $Sn^{2+}$ ions for future anchoring of PGM nuclei on the substrate surface;
(c) of activation whereby PGM ions are reduced by the sensitized $Sn^{2+}$ ions to yield neutral PGM nuclei for the PGM nuclei to chemically bound to the substrate via aminosilane derivative;
(d) of acceleration whereby use of dilute hydrochloric acid to remove $Sn^{2+}$ from the support leads to formation of $Sn^{4+}$;
(e) of electroless deposition of the PGM layer, through immersion of the functionalized and activated powders in an electroless plating bath.

Yet further to the invention, a metallic hydrogen-forming material obtained by the method as described herein.

The aminosilane may be water-soluble and provided as an aqueous solution.

The aminosilane may include at least component selected from the group consisting of:
(a) γ-aminopropyltriethoxysilane;
(b) γ-aminopropyltrimethoxysilane;
(c) γ-isocyanatopropyltriethoxysilane;
(d) N-beta-(aminoethyl)-γ-aminopropyltrimethoxysilane;
(e) bis-(γ-trimethoxysilylpropyl)-amine;
(f) N-phenyl-γ-aminopropyl-trimethoxysilane;
(g) N-beta-(aminoethyl)-γ-aminopropylmethyldimethoxysilane; and
(h) γ-mercaptopropyltrimethoxysilane.

The metallic hydride-forming material may be provided as a powder.

Particles of the powder may be covered with functional groups (e.g., surface oxides or hydroxides) having electrophilic nature.

The covering with the functional groups may occur natural and/or artificially.

The metallic hydride-forming material may be a powder of Rare-Earth-Nickel based $AB_5$-type hydrogen storage alloy which allows contact of the powder with air.

The method may include the step of preliminary complexation of activation nuclei of the Platinum Group Metal(s).

The step of preliminary complexation may be applied prior to the deposition of the Platinum Group Metal(s).

The step of functionalization treatment may be carried out with a 1% aqueous solution of γ-aminopropyltriethoxysilane (γ-APTES), at neutral or alkaline conditions and the temperature of about 90° C., for about 1 hour.

The Platinum Group Metal(s) may be Palladium.
The Platinum Group Metal(s) may be Platinum.
The step of Platinum Group Metal deposition may be performed in a hypophosphite-based plating bath.
The method may include the step of sensitization of the metallic hydride-forming material by $Sn^{2+}$ ions.
The step of preliminary complexation of activation nuclei of the PGM may be carried out by a treatment of the metallic hydride-forming material with a $PdCl_2$ solution combined with 1% aqueous solution of γ-aminopropyltriethoxysilane (γ-APTES), at a temperature of about 90° C., for about 1 hour.

The Platinum Group Metal(s) may be Palladium and/or Platinum and the deposition step may be performed by means of a dilute $PdCl_2$ and/or $PtCl_4$ solution.

The Platinum Group Metal(s) may be Palladium and/or Platinum and may include the step of reduction of immobilized PGM ions, by treatment of the metallic hydrogen-forming material with a reducing agent.

The reducing agent may be sodium hypophosphite.

The sodium hypophosphite may be provided as a 10 g/L aqueous solution, and the reduction of immobilized Platinum Group Metal(s) ions may be carried out at a temperature of about 50° C., for about 1 hour.

The reducing agent may be a 1 M hydrazine aqueous solution.

The reduction of immobilized PGM ions may be carried out at a temperature of about 50° C., for about 2 hours.

The reducing agent may be gaseous hydrogen.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
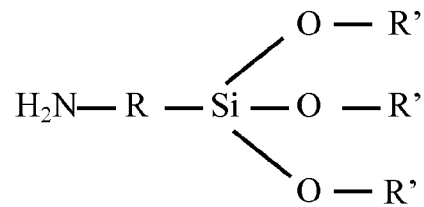
FIG. 1: a schematic molecular diagram of an aminosilane molecule.

Referring to the drawings, a method of surface modification of a metallic hydride-forming material in accordance with the invention is shown.

The method of surface modification of a metallic hydride-forming material according to the invention, includes the steps (a) of functionalization treating the surface of a metallic hydride-forming material with aminosilane to deposit self-assembled monolayers onto the surface; and (b) of depositing at least one Platinum Group Metal onto the treated surface of the metallic hydride-forming material whereby chemical bonding occurs between the Platinum Group Metal(s) and the self-assembled monolayers.

By increasing the adhesion between the nuclei and the substrate surface, through a chemical conjunction, the maximum utilization of the precious metal ions in solution is guaranteed, and stability of the bath is ensured. In addition, the overall coverage and quality of the final PGM layer can be increased.

Thin oxide layers exist on the surface of hydride forming metals and alloys, especially when they are stored in non-inert environments. These oxide layers are catalytically inactive towards the surface-sensitive hydrogen exchange reactions and inhibit interactions with PGM precursor ions in an electroless plating solution. Rather than removing the oxide layers, an approach could be adopted to modify these layers prior to deposition of PGM-based surface coatings so as to promote increased adhesion and quality of the coating. It can be realised by the alteration of the surface chemical state by aminosilane functionalization, to be a "soft" pre-treatment method which does not damage the surface prior to adhesion of PGM nuclei.

FIG. 1 schematically shows the structure of an aminosilane molecule. The terminal amine group (—NH$_2$), due to its electron-donating nature, has the ability to react with PGM precursor ions. At the same time, the —Si(OR')$_3$ functional group is hydrolysable to yield silanol derivative, —Si(OH)$_3$, in aqueous solution. In turn, covalent bonding occurs by the reaction of oxide or hydroxyl groups on the substrate surface with a hydroxyl of the silanol group of the hydrolysed aminosilane molecule. In this way a self-assembled monolayer (SAM) can be formed. One monolayer of the aminosilanes may potentially range between 5 and 25 Å in thickness. The aminosilane molecules align themselves perpendicular to the substrate surface where they form a network structure of ladder-like polysiloxane chains. Thus the aminosilane coupling agent is bifunctional allowing for chemical bonding at both ends of its molecule and therefore provides a platform strongly bound to the substrate, where the solvated PGM precursor ions can be anchored on the amine group. The terminal amine group is strongly electron-donating and as a result possesses great ligand capability to transition metal ions due to lone pair electrons on the nitrogen atom. Also, PGM precursor ions (e.g. Pt$^{2+}$, Ru$^{3+}$, Pd$^{2+}$) possess unoccupied lower energy p- and s-orbitals which have high affinities towards the lone electrons on the terminal amine functional group of the aminosilane molecule. Upon immobilization of PGM precursor ions on the aminosilane SAM, a chemical bond is formed between the nitrogen atoms and the PGM precursor ions which later graduate into metallic PGM catalysts (e.g. Pt$^0$, Ru$^0$, Pd$^0$). Finally, by increasing the surface adhesion of the substrate surface through a chemical conjunction the maximum utilization of the PGM ions in solution is guaranteed.

Aminosilanes are typically used as modifying agents for the pre-treatment of stationary phase adsorbents in chromatographic studies. The aminosilanes are also used for the modification of surfaces of various inorganic and organic materials followed by metallization.

A common practice is the metallization of non-metallic supports, by treatment of their surface with a bifunctional coupling agent (including aminosilane) followed by electroless metal plating; some embodiments envisage combining of the steps of surface functionalization and introduction of the metal precursor ions (e.g., Pd$^{2+}$) where the latter are added to the solution of the coupling agent whose metal-capturing functional groups (e.g., —NH$_2$) form the complex with the precursor ion (this step is followed by the reduction of the immobilized metal ions using, e.g., boron-organic compounds).

Aminosilanes have the added advantages of commercial availability, simple functionalization mechanism, high water solubility, high branching capacity, high flexibility, ability to polymerize, and ability to improve control of the interfacial chemistry during electroless deposition.

The present invention discloses a method of surface modification of hydride-forming hydrogen storage alloys by the deposition of Platinum Group Metals. A preferred embodiment of the invention provides for the usage of the parent hydride-forming alloy (e.g., AB$_5$-, or AB-type intermetallides) as a powder and Palladium as the Platinum Group Metal to be deposited onto the surface of the powder particles.

According to the invention, the first step of the procedure is a functionalization of the surface of the alloy by its treatment with an aqueous solution of a water-soluble aminosilane taken as a lone component, or as a mixture of the components selected from the following list:

γ-aminopropyltriethoxysilane;
γ-aminopropyltrimethoxysilane;
γ-isocyanatopropyltriethoxysilane;
N-beta-(aminoethyl)-gamma-aminopropyltrimethoxysilane;
bis-(gamma-trimethoxysilylpropyl)-amine;
N-phenyl-gamma-aminopropyl-trimethoxysilane;
N-beta-(aminoethyl)-gamma-aminopropylmethyldimethoxysilane;
γ-mercaptopropyltrimethoxysilane.

The functionalization is carried out at conditions which depend on the nature of the parent alloy (component composition, particle size, conditions of handling, state of the surface, etc.), performances of PGM coating (material, thickness, density), as well as characteristics of the plating baths (type of PGM and reducing agent, concentration, presence of sensitization agent). The most typical, but not limiting the scope of the invention, conditions are: 1% aqueous solution of γ-aminopropyltriethoxysilane (γ-APTES), neutral or alkaline conditions, temperature 90° C., duration of the procedure about 1 hour.

Figure 2:
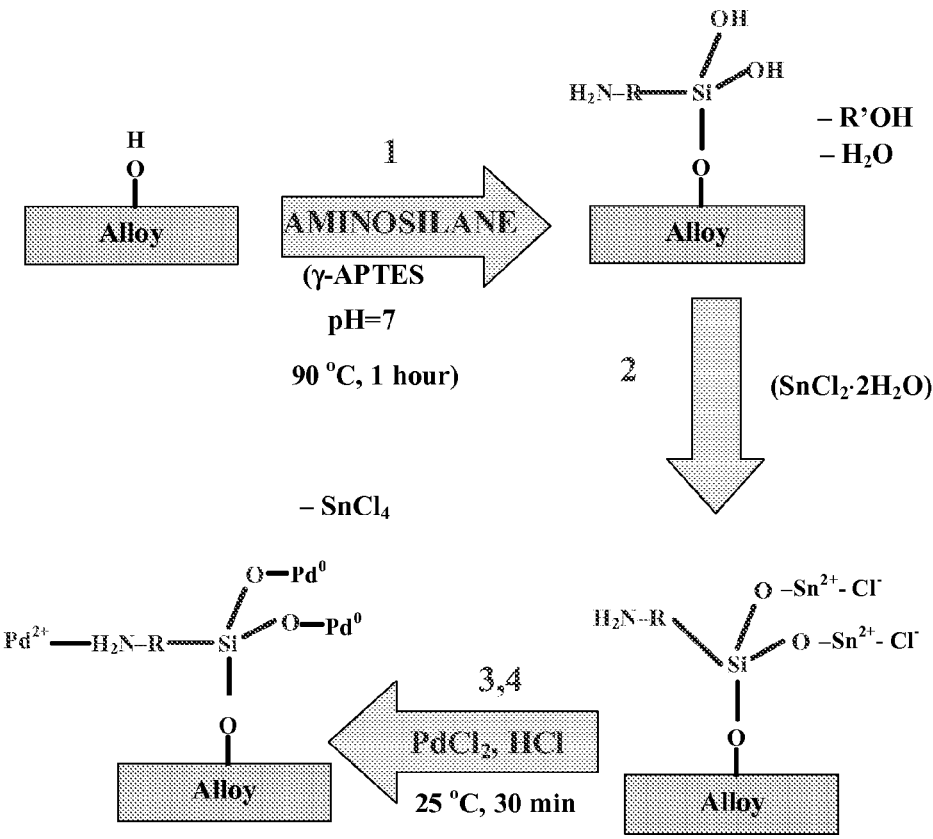
FIG. 2: a schematic representation of functionalization and sensitization/activation on the surface of hydride forming alloy (steps 1-4), according to the invention.

A schematic representation of the functionalization approach on the powder surface is given as FIG. 2. This embodiment of the present invention is the closest solution to prototype ones realising a method of surface modification by an electroless deposition of a Platinum Group Metal (e.g., Pd) onto a substrate material (see the description above; steps (1)-(5)). The sensitization-activation route, steps (2) and (3), is represented as the two-step version, although these processes can be conducted in one step using a mixed acidified $PdCl_2$—$SnCl_2$ colloidal solution. Functionalization (step (1)) is optimally conducted in aqueous solution where hydrolysis of aminosilane molecule results in the formation of its silanol derivative, $H_2N$—$R$—$Si(OH)_3$ which subsequently polymerizes on the substrate surface to form a "mesh". Alternatively, aminosilanes in non-aqueous solution result in the "brush" type formation on the substrate surface. The aminosilane molecule is also bifunctional in that it can bond to the surface of the substrate, polymerize with other aminosilane molecules, and bond with the PGM nuclei. Linkage typically occurs by bonding between oxide or hydroxyl groups on the substrate surface with the terminal hydroxyl group of the silanol derivative of the aminosilane molecule. Typically, the surface of the hydride forming alloy is highly oxidized through interaction of its components having high affinity to oxygen (RE, Ti, Mg, etc.) with $O_2$, $H_2O$ and other oxygen-containing species present in the environment. It facilitates the deposition of the self-assembled monolayer (SAM) aligned perpendicular to the surface of the substrate. The electron-accepting PGM ions, as $Pd^{2+}$, can then be immobilized by the electron-donating terminal amine groups of the SAM, as they possess high affinity towards ligands containing nitrogen, sulphur or phosphorous donor atoms. Since $Pd^{2+}$ ions form stronger bonds with nitrogen than those with oxygen, they will therefore not bond directly to surface hydr (oxide) functional groups. However, $Pd^{2+}$ ions are well known to be reduced on the colloidal $Sn^{2+}$ ions sensitized onto the surface of the substrate. During sensitization (step (2)) the $Sn^{2+}$ ions attach themselves to the surface oxide or hydroxyl groups, or, alternatively, to the residual hydroxyl groups of the aminosilane silanol derivative. Activation (step (3)) then continues by $Pd^{2+}$ reduction into $Pd^0$ nuclei assisted by $Sn^{2+}$ oxidation, to yield $Sn^{4+}$ which leaches back into solution (step (4)). The $Pd^0$ species take on the role of reaction catalysts after the palladium deposition (step (5); not shown) was allowed to commence on the activated substrate surface. As a result, the Pd particles grow around the nuclei which are chemically bound to the substrate via the aminosilane derivative. In turn, due to the reducing nature of the plating solution, the $Pd^{2+}$ ions bound with the aminosilane terminal amino-group are reduced to $Pd^0$ as well, thus resulting in the formation of the additional Pd nuclei bound to the substrate. It facilitates an improved deposition of PGM (e.g., Pd) by electroless plating and, in turn, improves dramatically hydrogen sorption performances of the surface-modified material.

The polar nature of the interface between the MH alloy and Pd atoms allows for an efficient transfer of hydrogen atoms to be formed in the course of dissociation of $H_2$ molecules on Pd to the alloy, by spill-over mechanism. It promotes high rates of hydrogen absorption by the surface-modified MH alloy.

According to another embodiment of this invention, the first step of the functionalization procedure is the complexation of the PGM (e.g., Pd) nuclei, by mixing an aqueous solution containing soluble PGM (e.g., $Pd^{2+}$) ions with an aqueous solution of a water-soluble aminosilane. It is important that, according to this embodiment, the electroless plating procedure does not include the sensitization assisted by $Sn^{2+}$ ions (step (2)) followed by tin removal (step (4)) which is commonly used for the electroless PGM deposition. The PGM-aminosilane complex is subsequently bonded to the oxide or hydroxyl groups on the hydrogen storage alloy being contacted with the mixed solution, through covalent bonding, thus creating a SAM of the PGM-aminosilane complex on the alloy surface. After completion of this procedure, and the subsequent reduction of the nuclei, the material is subjected to a standard procedure of the electroless plating of PGM (step (5)), for example, deposition of Pd in a hypophosphite-based plating bath.

Figure 3:
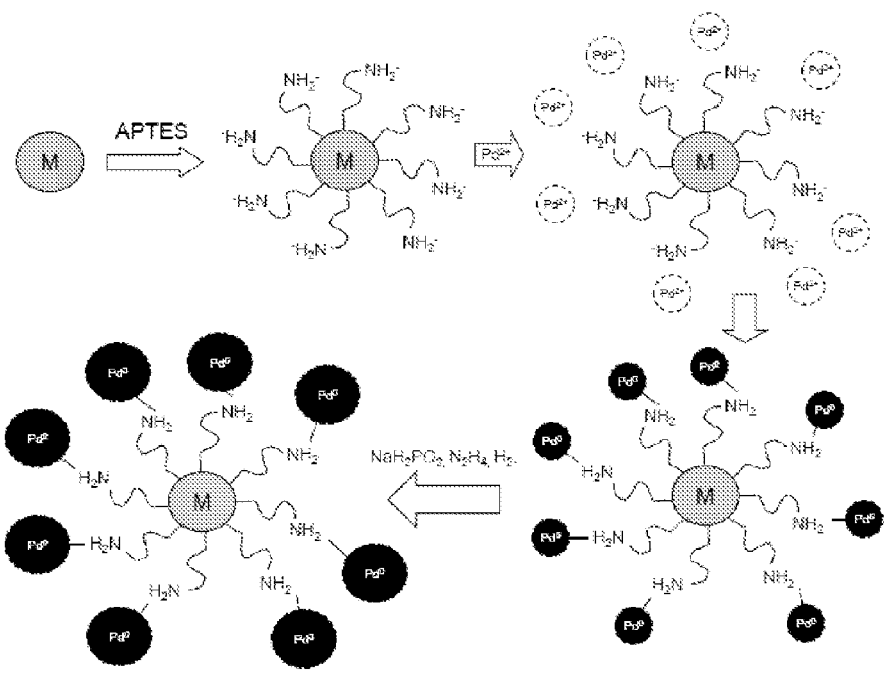
FIG. 3: a schematic diagram of deposition of the SAM of an aminosilane (γ-aminopropyltriethoxysilane) on the surface of particle of the powdered material and subsequent deposition of palladium particles from a dilute palladium salt solution containing the metal ion precursor.

A schematic diagram illustrating the third embodiment of the invention is given in FIG. 3. γ-aminopropyltriethoxysilane (γ-APTES) as a SAM-forming agent, in combination with Pd as PGM, are used to illustrate the functionalization. Covalent bonding, after hydrolysis, links the oxide or hydroxyl groups on the substrate surface with the silicon atom of the γ-aminopropyltriethoxysilane molecule (with the loss of water molecules), thus creating a self-assembled functional monolayer on the surface. The γ-aminopropyltriethoxysilane SAM is constituted by γ-aminopropyltriethoxysilane molecules aligning themselves perpendicular to the substrate surface where they form a network structure of ladder-like polysiloxane chains. γ-aminopropyltriethoxysilane introduces exposed amine groups, which themselves have a reducing nature, which can further be used to bond to $Pd^{2+}$ ions in the aqueous environment. In doing so, γ-aminopropyltriethoxysilane provides a platform onto which the electron-accepting $Pd^{2+}$ ions, from the activating colloidal solution, can be immobilized. Subsequent reduction of the $Pd^{2+}$ ions to $Pd^0$ metallic surface particles occurs in solution as a result of the electron-donating nature of the terminal amine group of the γ-aminopropyltriethoxysilane molecule. Further particle growth can be achieved by the addition of a reducing agent such as hydrazine, sodium hypophosphite, and hydrogen gas. So, this embodiment allows omission of a standard stage of the electroless deposition (step (5)) using plating bath which contains both PGM precursor ions and a reducing agent in the same solution. Such a combination allows for further autocatalytic reduction of the noble metals in the plating bath, rather than on the substrate surface only. The end result of this side process (eliminated by this embodiment of the invention) is in the decomposition of the plating bath and the loss of the expensive plating agent.

Example 1

A commercial Michmetal-Nickel based $AB_5$-type hydrogen storage alloy (La, Ce, Pr, Nd)(Ni, Co, Al, Mn)$_5$ delivered in powdered form (particle size 10 to 70 μm) and handled allowing its contact with air was used in the experimental studies. Before surface modification with Pd, the alloy was separated into two samples one of those (Sample #1) was subjected to surface functionalization by the treatment with the 1% solution of γ-aminopropyltriethoxysilane (γ-APTES) at pH=7 (adjusted with 10 vol % hydrochloric acid) and T=90° C. during 1 hour. The Sample #1 and the non pretreated Sample #2 were further activated and sensitized in a mixed acidic $PdCl_2$+$SnCl_2$ colloidal solution (30 minutes at room temperature), and then surface-modified with palladium in a hypophosphite-based electroless plating bath (0.2 g/100 mL $PdCl_2$; 0.4 mL/100 mL HCl, 16 mL/100 mL $NH_4OH$; 2.7 g/100 mL $NH_4Cl$; 1 g/100 mL $NaH_2PO_2.H_2O$) at 50° C., during 30 minutes; the plating conditions were the same for both samples.

Figure 4:
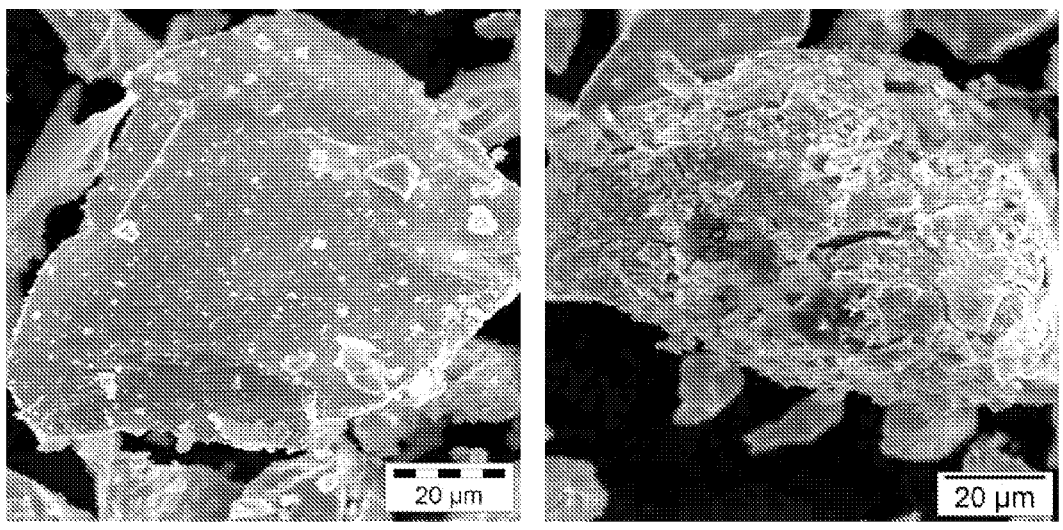
FIG. 4: an illustration of Example 1 and presents SEM images of the Pd-modified $AB_5$ alloy without preliminary surface functionalization (A; Sample #2) and after surface functionalization in 1% water solution of γ-APTES (B; Sample #1)

FIG. 4 shows SEM images of the surface-modified $AB_5$ alloy, Samples #1 (B) and #2 (A). The images were taken in secondary electrons using Hitachi X-650 EM instrument, working distance of 15 mm, 75 . . . 80 µA current and accelerating voltage of 25 kV. It is seen that Sample #1 which was passed preliminary surface treatment in the γ-APTES solution exhibits the more uniform and dense coating with Pd than the reference Sample #2 whose surface modification was done without this pre-treatment. This was also confirmed by the parallel energy-dispersive spectroscopy (EDS) compositional analysis, according to which the content of palladium on the surface of the pre-treated Sample #1 (51 wt % Pd) 3 times exceeded that for the untreated Sample #2 (17 wt % Pd). The total Pd loadings determined by Atomic Absorption Spectroscopy (AAS; Philips PU9100, λ=244.8 nm, bandpass=0.2 nm, current=15 mA) of the solution obtained by digesting of the samples in aqua regia corresponded to 1.0-1.2 wt. % and 0.3-0.9 wt. % Pd, for Samples #1 and #2, respectively. Note that higher discrepancies in the values of the total Pd loading were observed for the different unfunctionalized samples (#2), as compared to the functionalized ones (#1). Thus, in addition, the aminosilane functionalization results in better reproducibility of the surface modification procedure that is important for industrial upscaling of this technology.

Figure 5:
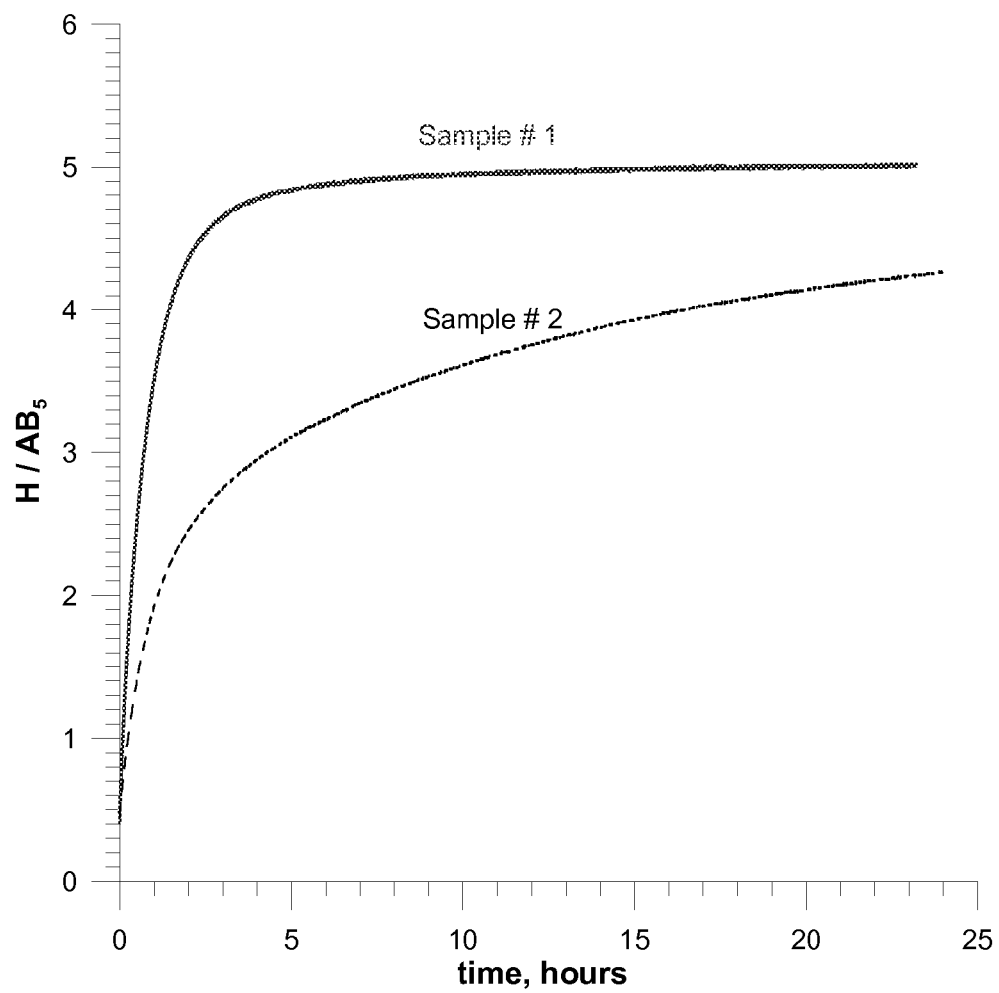
FIG. 5: an illustration of Example 1 and shows dynamics of hydrogen absorption ($P_{H2}$=5 bar, T=20° C.) by non-activated Pd-modified $AB_5$ alloy after surface functionalization in 1% water solution of γ-APTES (Sample #1) and without preliminary surface functionalization (Sample #2)

Measurements of hydrogen absorption by the surface-modified with Pd $AB_5$ alloy were carried out using a Sieverts setup, without application of activation procedure (heating in vacuum). At the experimental conditions (starting hydrogen pressure 5 bar, T=20° C.) both samples absorb hydrogen (FIG. 5), as distinct from the unmodified non-activated alloy which does not absorb significant amounts of hydrogen in 24 hours. However, Sample #1 which was passed preliminary surface treatment in the γ-APTES solution exhibits better hydrogen absorption kinetics to reach in ~5 hours the maximum hydrogen absorption capacity (H/$AB_5$=5, determined separately for the non-modified sample, after its vacuum heating to T=250° C. followed by the hydrogenation at the same conditions). At the same time, the untreated Sample #2 absorbs less than 4H atoms per $AB_5$ formula unit in 24 hours.

So, the surface functionalization of hydrogen storage alloys by aqueous solution of aminosilanes improves the subsequent process of the electroless plating of the alloys with PGM to yield more dense and uniform coating and, by such a way, resulting in better hydrogen sorption performances of the surface-modified alloys.

Example 2

The $AB_5$ hydrogen storage alloy identical to one used in Example 1 was used as a substrate material. The alloy was separated into two samples. Sample #1 (representing the material prepared by the method disclosed in this patent application) was activated in an aqueous Pd (0.6 g/L)-γ-APTES (1 vol %) solution for 1 hour at 90° C. (pH=7; neutralized using $NH_4OH$). 100 mL of 10 g/L $NaH_2PO_2$ solution was added to the sample slurry and stirred constantly at 50° C. for 1 hour. In doing so the $Pd^{2+}$ ions immobilized by the γ-APTES complexing agent were reduced to $Pd^0$. The activated material was then dried for 1 hour at 80° C. Standard Pd electroless plating for 30 minutes was subsequently conducted in a hypophosphite-based electroless plating bath (the same formulation as for Example 1). The modified material was then washed with copious quantities of deionised water and dried for 2 hours at 80° C.

Sample #2 (representing the material prepared by a conventional electroless deposition technique) was prepared similarly, as it was described in Example 1 (Sample #2).

Figure 6:
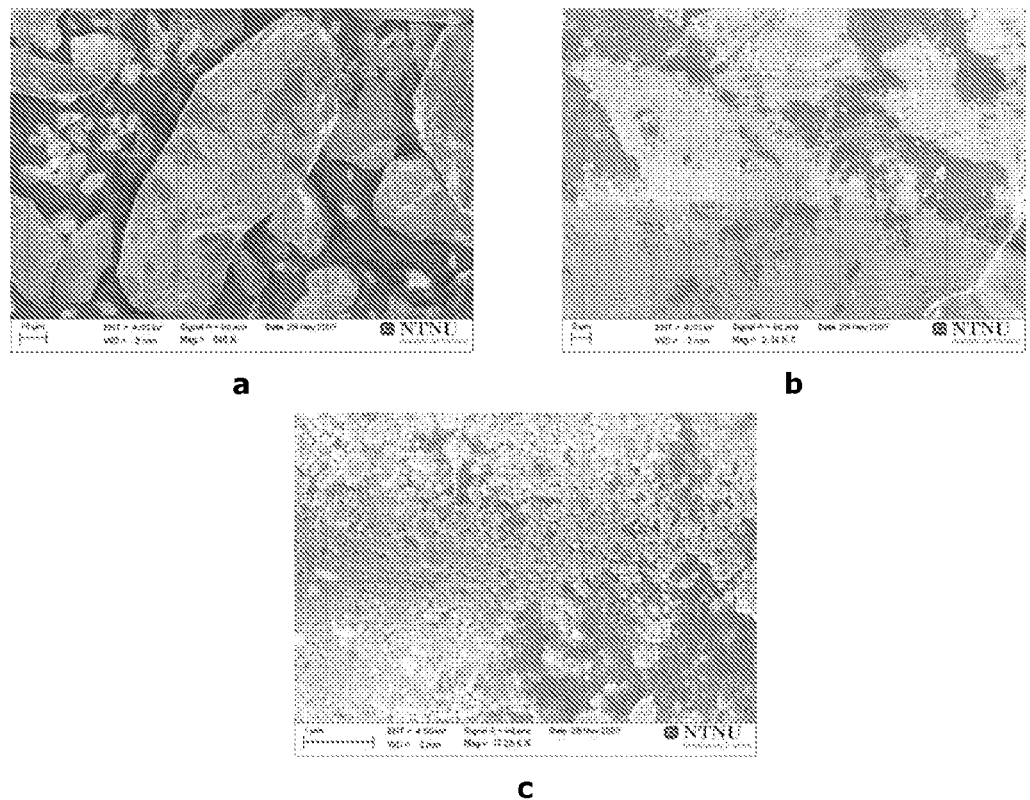
FIG. 6: an illustration of Example 2 and presents SEM images of the Pd-modified $AB_5$ alloy after preliminary complexation of Pd activation nuclei and subsequent Pd deposition (Sample #1)
Figure 7:
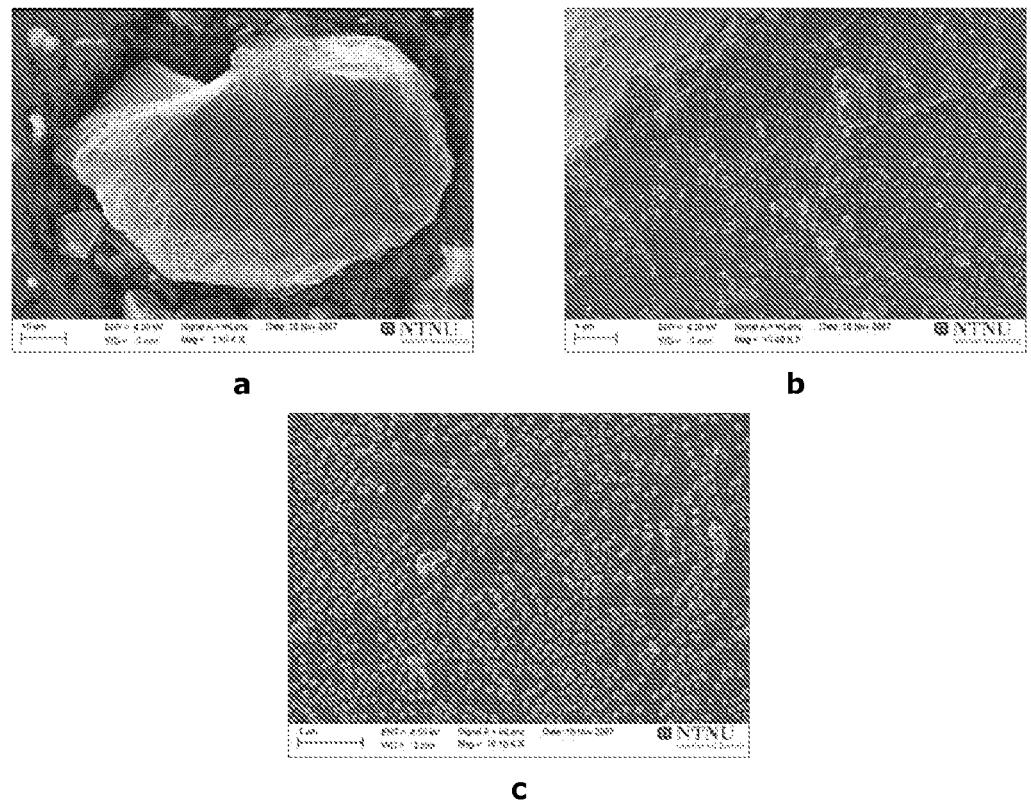
FIG. 7: an illustration of Example 2 and presents SEM images of the Pd-modified $AB_5$ alloy using preliminary sensitization-activation in a Pd—Sn colloidal solution and subsequent Pd deposition (Sample #2)

FIG. 6(a-c) and FIG. 7(a-c) show SEM images of the surface-modified $AB_5$ alloy, Sample #1 and Sample #2, respectively. The images were taken using an in-lens backscatter detector of a Zeiss Ultra 55 instrument, working distance of 3 mm, 75 . . . 80 µA current and accelerating voltage of 4 kV. It is seen that Sample #1 which was passed preliminary complexation of the Pd activation nuclei in γ-APTES solution exhibits the more uniform and dense coating with Pd than that observed for Sample #2 whose surface modification was done without this preliminary complexation. This is also confirmed by the elemental analysis of the total palladium content using AAS of the samples digested in aqua regia, according to which the total content of palladium on Sample #1 (1.0 wt % Pd) significantly exceeds that for Sample #2 (0.2 wt % Pd).

Figure 8:
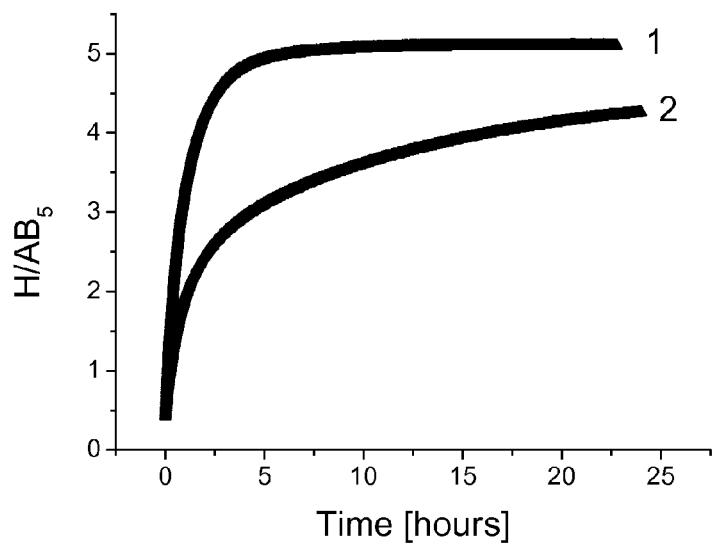
FIG. 8: an illustration of Example 2 and shows dynamics of hydrogen absorption ($P_{H2}$=5 bar, T=20° C.) by non-activated Pd-modified $AB_5$ alloy after preliminary complexation of Pd activation nuclei and subsequent Pd deposition (Sample #1); and using preliminary sensitization-activation in a Pd—Sn colloidal solution and subsequent Pd deposition (Sample #2)

Measurements of hydrogen absorption by the surface-modified with Pd $AB_5$ alloy (same conditions as for Example 1) show that both samples absorb hydrogen (FIG. 8), as distinct from the unmodified non-activated alloy which does not absorb noticeable amount of hydrogen in 24 hours. However, Sample #1 which was passed preliminary complexation of Pd activation nuclei and subsequent Pd deposition exhibits better hydrogen absorption kinetics to reach in less than 3 hours the maximum hydrogen absorption capacity (H/$AB_5$=5). At the same time, Sample #2 which was subjected to preliminary sensitization-activation in a Pd—Sn colloidal solution and subsequent Pd deposition absorbs less than 4H atoms per $AB_5$ formula unit in 24 hours.

Example 3

Figure 9:
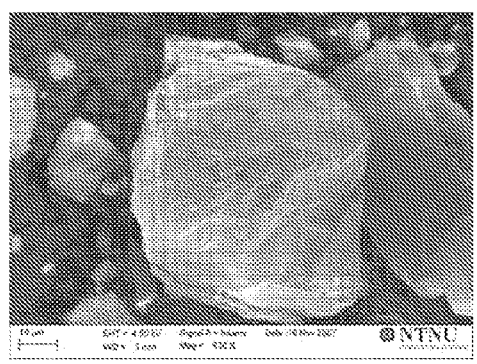
FIG. 9: an illustration of Example 3 and presents SEM images of the unmodified $AB_5$ alloy (A; Sample #1) and after deposition of self-assembled monolayer of γ-APTES and Pd deposition from dilute $PdCl_2$ solution (B; Sample #4)
Figure 9:
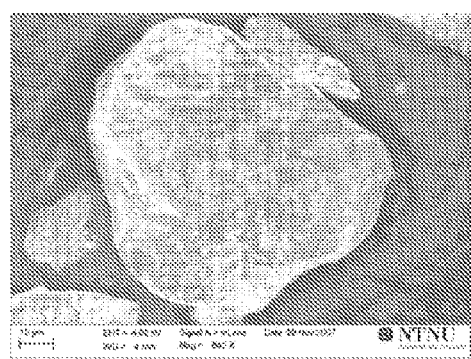

The $AB_5$ hydrogen storage alloy identical to one used in Examples 1 and 2 was used as a substrate material. The aminosilane SAM was deposited on the surface of the substrate by treatment in aqueous 1% solution of γ-aminopropyltriethoxysilane (γ-APTES) at pH=7 (adjusted with 10 vol % hydrochloric acid), T=90° C., 250 rpm, for 1 hour. The materials were surface-modified with palladium by magnetic agitation (250 rpm) in dilute acidic $PdCl_2$ solutions (i.e. $PdCl_2$ dissolved in HCl at 50° C.) at room temperature, for 24 hours (pH=1). The concentration of the $PdCl_2$ solutions was varied between 0.1 and 1.0 g/L with an associated change in the acidity from moderately acidic to strongly acidic. Particle growth and stability was ensured through further reduction with 10 g/L sodium hypophosphite solution, and reaction was allowed to progress for 2 hours @ 50° C. The samples were allocated as follows:

Sample #1: Unmodified $AB_5$ core alloy
Sample #2: 0.1 g/L $PdCl_2$
Sample #3: 0.2 g/L $PdCl_2$
Sample #4: 0.5 g/L $PdCl_2$
Sample #5: 1.0 g/L $PdCl_2$ FIG. 9 shows SEM images of the unmodified and surface-modified $AB_5$ alloys, Samples #1 and #4, respectively. The images were collected using the in-lens electron backscatter detector of a Zeiss Supra 55 electron microscope, working distance of 3-4 mm and accelerating voltage of 4.0 kV. It is seen that Sample #1 which was not passed through preliminary surface treatment in the γ-APTES solution, and not subjected to a dilute $H_2PdCl_4$ solution, exhibits a fairly featureless surface without any metal deposits of different atomic weight (i.e. Pd). Sample #4 which was subjected to the surface pre-treatment and further modified using the 0.5 g/L $PdCl_2$ solution showed evidence of deposition of Pd layers on the surface, which takes on a marbled appearance.

Figures 10, 11:
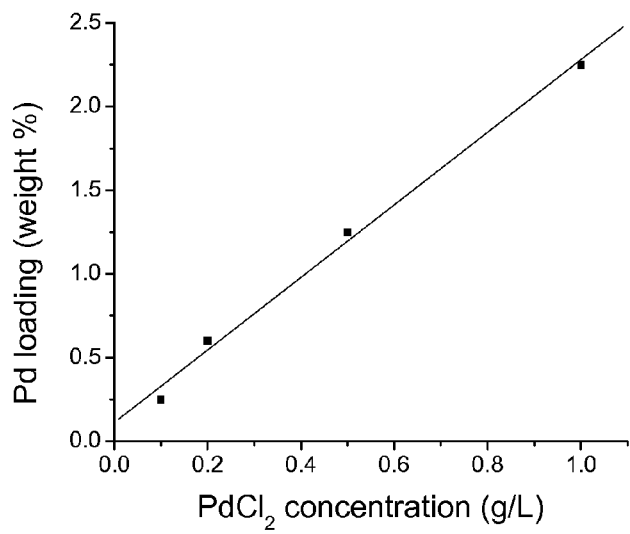
FIG. 10: an illustration of Example 3 and shows EDS data on $AB_5$ alloy samples after deposition of self-assembled monolayer of γ-APTES followed by surface modification using dilute $PdCl_2$ solutions.
FIG. 11: an illustration of Example 3 and shows elemental analysis data (AAS) for the starting PdCl$_2$ solutions and the filtrates after Pd deposition on the AB$_5$ core alloy.

Elemental analysis (EDS) of the surface-modified $AB_5$ alloys, after deposition of γ-APTES SAM and treatment in acidic PdCl$_2$ solutions followed by reduction in the NaH$_2$PO$_2$ solution, illustrated a linear increase in the surface Pd loading with PdCl$_2$ concentration (FIG. 10). Maximum of 2.22 wt % Pd was observed with the treatment in 1.0 g/L PdCl$_2$ solution.

Elemental analysis, through AAS, of the starting PdCl$_2$ solutions and the filtrates after Pd deposition on the AB$_5$ core alloy, pretreated using γ-APTES SAM's, suggest that almost 100% of the Pd$^{2+}$ precursor ions in the starting solution had been adhered to the γ-APTES SAM on the AB$_5$ core alloy surface and reduced to form Pd$^0$ (FIG. 11).

Figure 12:
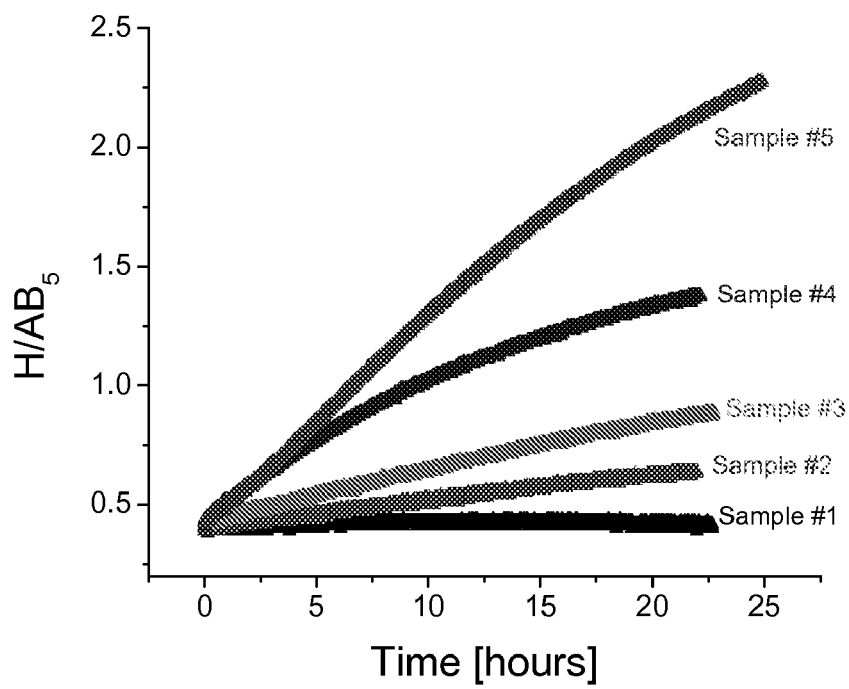
FIG. 12: an illustration of Example 3 and shows dynamics of hydrogen absorption (P$_{H2}$=5 bar, T=20° C.) by the core (Sample #1) and surface-modified (Sample #2-5) samples, without thermal pre-activation in vacuum, after deposition of γ-APTES SAM's and suspension in dilute PdCl$_2$ solutions.

Measurements of hydrogen absorption by the surface-modified AB$_5$ alloy were carried out at the same conditions as in Examples 1 and 2. At the experimental conditions (starting hydrogen pressure 5 bar, T=20° C.) all modified samples (Samples #2-5) absorb hydrogen (FIG. 12), as distinct from the unmodified non-activated alloy which does not absorb significant amount of hydrogen in 24 hours (Sample #1). Generally, the absorption of hydrogen increases almost linearly with an increase in the concentration of PdCl$_2$ solution.

Example 4

Figure 13:
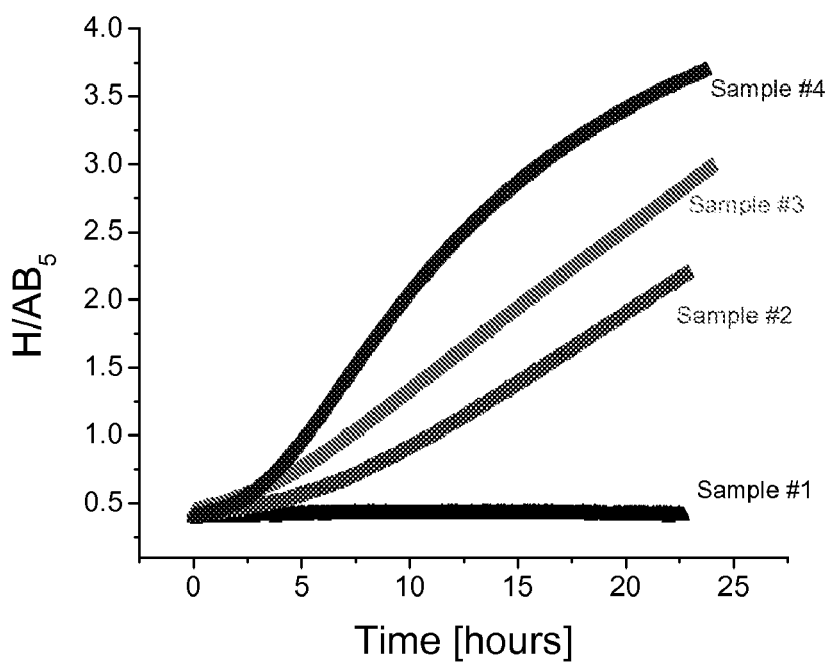
FIG. 13: an illustration of Example 4 and shows dynamics of hydrogen absorption (P$_{H2}$=5 bar, T=20° C.) by the core and surface-modified samples, without thermal pre-activation in vacuum, after deposition of γ-APTES SAM's and suspension in dilute PtCl$_4$ solutions.

The AB$_5$-type hydrogen storage alloy functionalized with γ-APTES solution (composition of the substrate and conditions of γ-APTES SAM deposition are the same as for Example 3) was surface-modified with platinum by magnetic agitation (250 rpm) in dilute PtCl$_4$ solutions at room temperature, for 24 hours (pH=1). The concentration of the PtCl$_4$ solutions was varied between 0.19 and 1.9 g/L (equimolar to PdCl$_2$ concentrations in Example 3) with an associated change in the acidity from moderately acidic to strongly acidic. Particle growth and stability was ensured through further reduction with 1 M hydrazine solution, and reaction was allowed to progress for 2 hours @ 50° C. The samples were allocated as follows:

Sample #1: Unmodified AB$_5$ core alloy
Sample #2: 0.19 g/L PtCl$_4$
Sample #3: 0.38 g/L PtCl$_4$
Sample #4: 1.9 g/L PtCl$_4$ Measurements of hydrogen absorption by the samples were carried out at the same conditions as for Examples 1-3. All modified samples (#2-4) show significant hydrogen absorption (FIG. 13), as compared to the unmodified non-activated alloy which does not absorb significant amount of hydrogen in 24 hours (Sample #1). Generally, the absorption of hydrogen increases almost linearly with an increase in the concentration of PtCl$_4$ solution.

So, the modification of an AB$_5$ alloy material using the proposed method involving surface deposition of Pt enhances the catalytic activity towards surface chemical processes and, by such a way, results in better hydrogen sorption performances of the surface-modified alloys. The hydrogen absorption performances are also noticeably better than those observed after modification in PdCl$_2$ solution (Example 3), and may be a result of the greater catalytic activity of platinum towards hydrogen exchange reactions as compared to palladium.

The deposition of platinum on the surface of the AB$_5$-type hydrogen storage alloy functionalized with γ-APTES solution, using the current method, was demonstrated for its attractiveness in enhancing the catalytic activity towards surface chemical processes and, by such a way, resulting in better hydrogen sorption performances of the surface-modified alloys. Previous experience with the deposition of platinum on the surface of the AB$_5$-type hydrogen storage alloy using traditional method (i.e. electroless plating in hydrazine-based baths) demonstrated limited success as quantities of platinum did not facilitate the expected improvement in the catalytic activity towards surface chemical processes and, by such a way, did not facilitate enhanced hydrogen sorption performances of the surface-modified alloys.

Optimisation

In one embodiment of the invention, the aminosilanes deposited onto the surface of the substrate can be subsequently used to immobilize soluble metal ions from solution, typically those derived from PGM's. The PGM ions may further be reduced using any type of reducing agent to further deposit metallic material to the autocatalytic surface sites produced during immobilization.

Another embodiment of the invention envisages combining of the functionalization procedure with the complexation of the PGM activation nuclei, by mixing an aqueous solution containing soluble PGM (e.g., Pd$^{2+}$) ions with the aqueous solution of the water-soluble aminosilane.

The increase in adhesion of PGM nuclei to the substrate, by their chemical bonding via a derivative of the aminosilane has the subsequent result of increasing the quality of PGM layers deposited using electroless deposition. The end result is the increase of poisoning tolerance properties and hydrogen absorption rates of the metal hydride materials.

The objectives of the present invention are:
a) to improve hydrogen sorption performances and poisoning tolerance of the hydride forming metallic substrate surface-modified by PGM;
b) to increase efficiency of PGM utilisation; and
c) to provide better PGM coating quality.

The present invention relates to a method of surface modification by an electroless deposition of Platinum Group Metals onto a substrate material, namely:
1) Functionalization by a pre-treatment of the surface of the substrate material with a solution of an aminosilane;
2) Sensitization with Sn$^{2+}$ ions, thus allowing for future anchoring of PGM nuclei on the substrate surface (step 3).
3) Activation: PGM ions are reduced by the sensitized Sn$^{2+}$ ions to yield neutral PGM nuclei. As a result, the PGM nuclei chemically bound to the substrate via aminosilane derivative are formed. In addition, PGM ions form complexes by their bonding to the nitrogen ligand from the terminal amino-group of the aminosilane derivative.
4) Acceleration: use of dilute hydrochloric acid to remove Sn$^{2+}$ from the support leads to formation of Sn$^{4+}$ (as SnCl$_4$, step 3), which leaches back into solution.
5) Electroless deposition of the PGM layer, through immersion of the functionalized and activated powders in an electroless plating bath.

In step (1), the substrate is a metallic hydride-forming hydrogen storage material taken as a powder whose particles are covered, by natural and/or artificial way, with functional groups (e.g., surface oxides or hydroxides) having electrophilic nature.

In step (1), the aminosilane is water-soluble, taken in an aqueous solution as a lone component, or as a mixture of components selected from the following list:
γ-aminopropyltriethoxysilane;
γ-aminopropyltrimethoxysilane;
γ-isocyanatopropyltriethoxysilane;
N-beta-(aminoethyl)-γ-aminopropyltrimethoxysilane;
bis-(γ-trimethoxysilylpropyl)-amine;
N-phenyl-γ-aminopropyl-trimethoxysilane;
N-beta-(aminoethyl)-γ-aminopropylmethyldimethoxysilane;
γ-mercaptopropyltrimethoxysilane.

In step (1), the treatment is carried out by 1% aqueous solution of γ-aminopropyltriethoxysilane (γ-APTES), at neutral or alkaline conditions and the temperature of 90° C., during 1 hour.

Steps (2) and (4) can be omitted.

Steps (1) and (3) can be combined, by introducing a procedure of the preliminary complexation of PGM activation nuclei, where the substrate material is treated with a mixture of two solutions; the first solution contains the aminosilane, and the second solution contains ions derived from the PGM.

In the combined steps (1) and (3), the substrate material can be treated by aqueous $PdCl_2$ solution mixed with 1% aqueous solution of γ-aminopropyltriethoxysilane (γ-APTES), at the temperature of 90° C., during 1 hour.

In steps (3) and (5), the Platinum Group Metal can be Palladium and/or Platinum.

In step (3), Palladium and/or Platinum can be introduced by a treatment of the functionalized substrate material in a dilute $PdCl_2$ and/or $PtCl_4$ solution; in this case step 5 can be replaced by a treatment of the functionalized and activated substrate with any reducing agent.

In step (5), a 10 g/L sodium hypophosphite-based aqueous solution containing PGM (e.g., Pd) in soluble form can be used as the plating bath, and the electroless deposition of the PGM can be carried out at temperature of 50° C., during 1 hour. The electroless plating is constituted as follows: 0.2 g/100 mL $PdCl_2$; 0.4 mL/100 mL HCl, 16 mL/100 mL $NH_4OH$; 2.7 g/100 mL $NH_4Cl$; 1 g/100 mL $NaH_2PO_2.H_2O$. Plating is conducted at room temperature for 30 minutes.

The invention claimed is:

1. A method of surface modification of a metallic hydride-forming material, which includes the steps
    (a) of providing a metallic hydride-forming material;
    (b) of functionalization treating the surface of the metallic hydride-forming material with aminosilane to deposit self-assembled monolayers onto the surface; and
    (c) of depositing at least one Platinum Group Metal onto the treated surface of the metallic hydride-forming material whereby chemical bonding occurs between the Platinum Group Metal(s) (PGM) and the self-assembled monolayers.

2. A method as claimed in claim 1, in which the aminosilane is water-soluble and provided as an aqueous solution.

3. A method as claimed in claim 1, in which the aminosilane includes at least component selected from the group consisting of:
    (a) y-aminopropyltriethoxysilane;
    (b) y-aminopropyltrimethoxysilane;
    (c) y-isocyanatopropyltriethoxysilane;
    (d) N-beta-(aminoethyl)-y-aminopropyltrimethoxysilane;
    (e) bis-(y-trimethoxysilylpropyl)-amine;
    (f) N-phenyl-y-aminopropyl-trimethoxysilane;
    (g) N-beta-(aminoethyl)-y-aminopropylmethyldimethoxysilane; and
    (h) y-mercaptopropyltrimethoxysilane.

4. A method as claimed in claim 1, in which the metallic hydride-forming material is provided as a powder.

5. A method as claimed in claim 4, in which particles of the powder are covered with functional groups having electrophilic nature.

6. A method as claimed in claim 5, in which the covering with the functional groups occurs natural and/or artificially.

7. A method as claimed in claim 1, in which the metallic hydride-forming material is a powder of Rare-Earth-Nickel based $AB_5$-type hydrogen storage alloy which allows contact of the powder with air.

8. A method as claimed in claim 1, which includes the step of preliminary complexation of activation nuclei of the Platinum Group Metal(s) (PGM) by using the aminosilane as a complex-forming agent.

9. A method as claimed in claim 8, in which the step of preliminary complexation is applied prior to the deposition of the Platinum Group Metal(s).

10. A method as claimed in claim 1, in which the step of funtionalization treatment is carried out with a 1% aqueous solution of γ-aminopropyltriethoxysilane (γ-APTES), at neutral or alkaline conditions and the temperature of about 90° C., for about 1 hour.

11. A method as claimed in claim 1, in which the Platinum Group Metal(s) is Palladium.

12. A method as claimed in claim 1, in which the Platinum Group Metal(s) is Platinum.

13. A method as claimed in claim 1, in which the step of Platinum Group Metal deposition is performed in a hypophosphite-based plating bath.

14. A method as claimed in claim 1, which includes a step of sensitization of the metallic hydride-forming material by $Sn^{2+}$ ions.

15. A method as claimed in claim 8, in which the step of preliminary complexation of activation nuclei of the PGM is carried out by a treatment of the metallic hydride-forming material with a $PdCl_2$ solution combined with 1% aqueous solution of γ-aminopropyltriethoxysilane (γ-APTES), at a temperature of about 90° C., for about 1 hour.

16. A method as claimed in claim 1, in which the Platinum Group Metal(s) is Palladium and/or Platinum and the deposition step is performed by means of a dilute $PdCl_2$ and/or $PtCl_4$ solution.

17. A method as claimed in claim 1, in which the Platinum Group Metal(s) is Palladium and/or Platinum and which includes a step of reduction of immobilized PGM ions, by treatment of the metallic hydrogen-forming material with a reducing agent.

18. A method as claimed in claim 17, in which the reducing agent is sodium hypophosphite.

19. A method as claimed in claim 18, in which the sodium hypophosphite is provided as a 10 g/L aqueous solution, and the reduction of immobilized Platinum Group Metal(s) ions is carried out at a temperature of about 50° C., for about 1 hour.

20. A method as claimed in claim 17, in which the reducing agent is a 1 M hydrazine aqueous solution.

21. A method as claimed in claim 20, in which the reduction of immobilized PGM ions is carried out at a temperature of about 50° C., for about 2 hours.

22. A method as claimed in claim 17, in which the reducing agent is gaseous hydrogen.

23. A method of surface modification by an electroless deposition of Platinum Group Metals (PGM) onto a pre-oxidized metallic powder substrate material, which includes the steps:
    (a) of functionalization by a pre-treatment of the surface of the substrate material with a solution of an aminosilane;
    (b) of sensitization with $Sn^{2+}$ ions for future anchoring of PGM nuclei on the substrate surface;
    (c) of activation whereby PGM ions are reduced by the sensitized $Sn^{2+}$ ions to yield neutral PGM nuclei for the PGM nuclei to chemically bound to the substrate via aminosilane derivative;
    (d) of acceleration whereby use of dilute hydrochloric acid to remove $Sn^{2+}$ from the support leads to formation of $Sn^{4+}$;

(e) of electroless deposition of the PGM layer, through immersion of the functionalized and activated powders in an electroless plating bath.

24. A metallic hydrogen-forming material obtained by the method as claimed in claim 23.

25. A metallic hydrogen-forming material obtained by the method as claimed claim 1.

* * * * *